April 20, 1965  M. M. MERLEN  3,179,820
REPETITIVE PULSE DUTY CYCLE READOUT DEVICE PARTICULARLY
FOR RADIATION DIMENSIONAL GAGES
Filed July 20, 1961

*INVENTOR.*
MONTY M. MERLEN
BY
*ATTORNEY*

United States Patent Office 3,179,820
Patented Apr. 20, 1965

3,179,820
REPETITIVE PULSE DUTY CYCLE READOUT DEVICE PARTICULARLY FOR RADIATION DIMENSIONAL GAGES
Monty M. Merlen, Stamford, Conn., assignor to Barnes Engineering Company, Stamford, Conn., a corporation of Delaware
Filed July 20, 1961, Ser. No. 125,493
4 Claims. (Cl. 307—112)

This invention relates to readout devices which indicate the duty cycle of repetitive pulses and more particularly to radiant energy dimension gauges using these devices.

The problem of producing a device which would accurately indicate the duty cycle of repetitive pulses is a serious one. While in its broadest aspect the present invention need not be concerned with the source of the pulses, the problem has such great practical importance in radiation dimension gauges that the invention will be described in connection therewith and in a specific aspect the combination is included.

The problem of radiation dimension gauges has become acute with the need for measuring material, often rapidly moving material, which cannot be touched practically either because the surface might be injured or, more often, because the material may be hot, moving or otherwise so located that actual contact is not practical. Two such situations are presented in the measurement of widths of extruded glass tubing and particularly extruded hot steel rods, bars and the like. The latter is particularly important at the present time and the present invention has permitted a major breakthrough in speed and accuracy of monitoring and/or automation of steel rod and bar mills. For this reason the following description will be primarily in terms of the measurement of the width of a hot steel rod or bar. The measurement has been effected by scanning across the moving rod and processing the output signal of the detector to produce a readout which is proportional to the width of the rod in spite of a wide variation of conditions.

A hot steel rod emits readily in the visible and fairly near infrared and the most practical radiations to use in measuring are, therefore, infrared radiations. However, all that is needed is a marked discontinuity in radiation between the background and the material to be measured and this is just as effective whether the material is hotter or colder than its background or in fact has radiation characteristics which differ markedly therefrom. For example, the measurement may be effected in connection with an illuminated background the material being relatively opaque to the radiations and so forming a sharp silhouette. Such operations are predominantly in the visible range and, of course, under suitable circumstances ultraviolet radiations may also be utilized although these occasions are rare.

The first practical gauge for measuring steel rods with the requisite accuracy is described and claimed in the patent of Robert W. Astheimer, 3,003,064, October 3, 1961. In this device the scanning is effected by a very simple rotating reticle provided with spaced small holes which effectively scan their small area across the rod or bar to be measured. In the case of the hot steel the radiation detector may be an infrared detector, for example a suitable photoconductor or bolometer.

The Astheimer gauge was immediately presented with two problems. One problem was presented by the radiation characteristics of the rod as it moved rapidly past the scanning heads. In practical operations three heads are usually used. Temperature of the rod, of course, affects the intensity of infrared radiation, changes of emission characteristics likewise having effect, and these problems can be quite severe when it is realized that the steel rod may be moving past the gauge at speeds from 50 to 90 miles an hour. The radiation problems were solved in the Astheimer gauge by limiters in the electronic circuits so that the intensity of the radiation made no difference and the final output, suitably averaged or integrated, was proportional to pulse width.

Another very serious problem is presented by scanning rate. If pulse width were read directly any small changes in reticle speed would be interpreted as changes in rod width because if the scan is slower it would appear that the rod was wider and if it is faster it would appear that the rod was narrower. This problem too was solved by the Astheimer gauge using pulse duty cycle readout circuitry including a null meter and a precision potentiometer across a D.C. source which determines the limited signal voltage. Pulse duty cycle is read independently of scanning speed because it is a ratio and scanning speed affects numerator and denominator proportionately. Once the potentiometer is set for a predetermined dimension deviations in either direction are then accurately read by the meter. However, the accuracy assumes practically perfect operation of the circuit components and a stabilized environment which is difficult to maintain in a steel mill.

Another vitally important feature is that in many cases it is necessary to utilize the gauge output signal as an error signal by means of which conventional servo equipment can correct any departure in rod dimensions from the desired value. The Astheimer gauge with the circuits there described is capable of a readout which steel mills had been forced to put up with but it could be used for actuation of servo controls only with difficulty.

In further work with the Astheimer gauge the above departures from the ideal became evident and it is with circuits which have, for practical purposes, eliminated any shortcomings that the present invention deals.

The particular operation of the present invention will be described in detail in comparison with the circuit used in the original model of the Astheimer gauge before it was modified and improved by means of the present invention. In the present invention electrical signals produced by the discontinuity at either edge of the moving material actuate switching means. The switching alternately connects one or other side of a floating D.C. potential to a predetermined reference voltage which may preferably be ground. In one position the switch connection remains in one position while the material is being scanned and the other position for the remainder of the scan cycle.

The invention will be described in greater detail in conjunction with the drawings in which.

Figure 1:
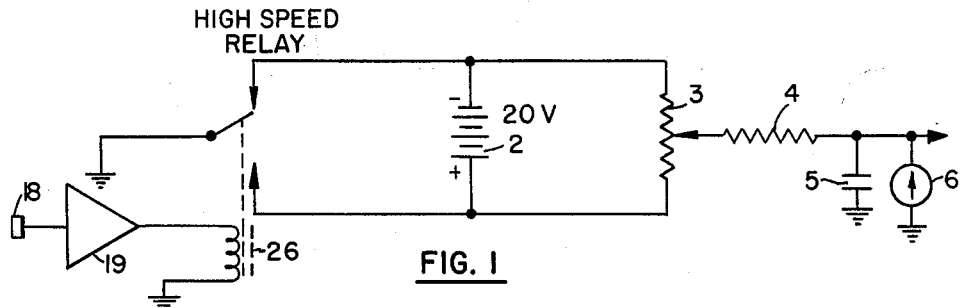
FIG. 1 is a schematic of a mechanically switched modification.

As pointed out above the present invention involves switching, preferably electronic. In FIG. 1 a high speed mechanical switch 1, part of a high speed relay with coil 26, is actuated by signal from a detector 18 amplified in an amplifier 19. The rest of the circuit comprises a battery 2 or other source of D.C. potential and an output potentiometer 3, the moving arm of which is connected to an integrating circuit composed of a resistance 4 and a capacitor 5 of suitable values depending on the switching frequency. The reference potential, to which the D.C. potential sides is switched, is ground.

In operation the circuit is initially calibrated by adjustment of the potentiometer 3 so that the D.C. voltage across capacitor 5 as indicated in meter 6 is zero for a rod of predetermined width. Gauging of the material to be measured then starts. If the width varies from the predetermined value a D.C. voltage is produced. The polarity is determined by the direction in which dimensions depart from the predetermined value. As the voltage goes through zero when the dimensions are exact the output can be directly used as an error signal for conventional servo mechanisms without encountering any problems.

The nulling used in calibration sets a certain ratio on the potentiometer between the moving arm and one end as compared to the total resistance. This ratio corresponds to the duty cycle, that is to say ratio between scan duration on the work and the total time between successive scans. The potentiometer dial can be suitably graduated to read widths directly. In the drawing a single potentiometer is used which is satisfactory for many measurements. If greater flexibility is desired a rheostat may be added in series with the top of the potentiometer in order to adjust the total resistance to match precalibrated potentiometer dials.

It will be noted that the switch is actuated only by the leading and trailing edges of the pulses. It is completely unaffected by the radiation intensity over all practically useful ranges because once the minimum voltage is reached the switch is actuated and it stays in either of its two positions regardless of variations of voltage in coil 26 due to radiation changes. The use of the edges only of the pulse, therefore, automatically produces perfect limiting and so the output D.C. voltage across capacitor 5 measures changes in duty cycle as the rod dimensions change. Since duty cycle is a ratio changes in scanning speed introduce no change in the output voltage throughout an enormous range far in excess of anything that can be practically encountered.

An examination of FIG. 1 shows that the potentiometer that yields zero output across capacitor 5 is not changed by variations in the battery 2. This only affects slightly the sensitivity of the null measurement but in no sense its presentation which is determined solely by the potentiometer 3. It is not even necessary that the total resistance of the potentiometer remain constant so long as both portions on either side of the moving arm retained their relative resistances. Environmental changes such as temperature and the like which can affect the resistance of the potentiometer affect, of course, the whole of the potentiometer and so do not introduce any inaccuracy. Changes in battery voltage do not affect precision and a very reliable null error signal output is obtained. Extreme precision is obtainable by the use of a multiturn potentiometer, for example a 10 turn helical potentiometer. We are dealing with precision instrumentation and so, of course, a high grade potentiometer is desirable. With multiple turns and an accurate dial extremely accurate measurements are possible. All that is necessary if dimensions change is that the potentiometer be reset to a zero reading, a simple matter with precision zero center galvanometers as a null indicator. Accuracies within 0.001" are readily obtainable and with special instrumentation even higher accuracies are possible.

When dealing with steel rods or bars the instrument is almost always used as a monitor rather than a measurer and so the potentiometer will not be reset for null for small variations of width. The meter will then read deviations from predetermined size and if automatic rolling mill adjustment is desired the output signal across capacitor 5 can be used to actuate conventional servo mechanisms.

Mechanical switches have only very moderate actuation speeds and they present a problem of wear. They also require fairly high driving power. For this reason the modification shown in FIG. 1, while operative and simple from the standpoint of explaining the invention, is not preferred in practice.

Figure 2:
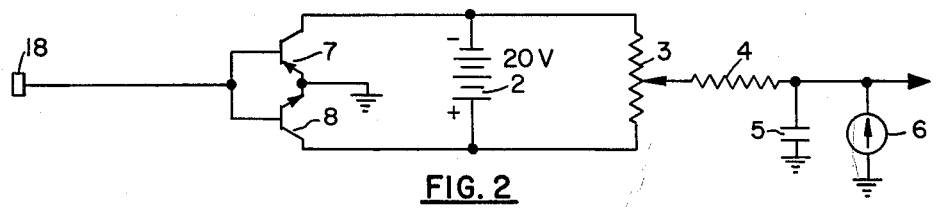
FIG. 2 is a schematic of a transistor switched modification.

Electronic switching which involves no moving parts presents advantages. The simplest circuit to use involves switching transistors. This is shown in FIG. 2 where similar elements bear the same reference numerals. The battery 2, potentiometer 3 and the output integrating circuit are the same as in FIG. 1. However, in place of the mechanical switch there are two complementary switching transistors 7 and 8. The circuit operates far faster than anything possible with a mechanical switching of FIG. 1.

In general the circuit of FIG. 2 may be considered as an ideal. The number of elements is small and the operation is fast and precise. The power input is, of course, minute compared to that of FIG. 1 and in certain cases, for example with photomultiplier tubes as radiation detectors, may permit elimination of any amplification of the detector signal and is so shown. However, in practical operation such as in a steel mill it is often necessary to locate the electronic processing circuits at some distance from the scanning heads and infrared detectors are commonly used. In the case of many rod mills this is particularly necessary because of the cramped space available for scanning heads. Therefore, ordinarily some degree of preamplification is incorporated in the scanning head to produce a signal which is not sensitive to picking up interference along a transmission line or in other words to improve the signal to noise ratio. Ordinarily, therefore, even electronic switching circuits will be used with preamplification. However, the preamplifier is simple and conventional and presents no problem.

Figure 3:
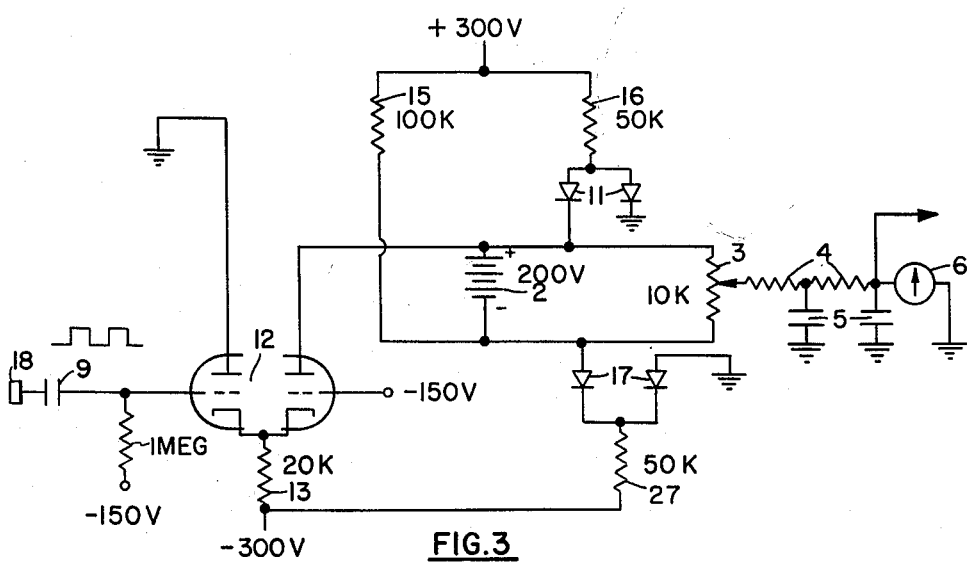
FIG. 3 is a schematic of a vacuum tube switched modification.

In FIG. 3 there is the same battery 2, potentiometer 3 and integrating circuit with resistors 4 and capacitors 5 and a meter 6 as in the preceding figures. The voltage of the battery is considerably higher, 200 volts instead of a maximum of about 20, but this is merely because of the characteristics of tubes as opposed to transistors. The use of tubes for switching requires somewhat greater complexity because tubes are not available in complementary types as are transistors and do not present substantially zero resistance when driven to saturation. The nature of the tubes, therefore, requires some additional circuitry which will alternately clamp the ends of the potentiometer to reference ground potential.

The input signal, the waveshape of which is shown along side, passes through capacitor 9 onto the grid of one-half of a dual triode 12. A high grid resistance 10 leads to −150 volts D.C. and the plate is grounded. The pulses on the grid alternately biases this tube section to cut-off or cause it to conduct relatively heavily. The operation is brought about by a relatively high cathode resistor 13 which returns the cathodes of both sections to a −300 volt source. The second section of the triode has its grid connected to −150 volts D.C. and the plate connects to the positive terminal of the battery 2. The two sections of the tube 12 act as a grounded grid cathode coupled amplifier. The plate load is in the form of a resistor 15 connecting a +300 volt D.C. source to the negative end of the battery 2.

In order to provide for switching to a definite reference point, in this case ground, auxiliary circuits are required because of the above-mentioned characteristics of tubes as opposed to transistors. The +300 volt supply is connected through a resistor 16 of about half the value of resistor 15 to the anodes of two diodes 11. The cathode of one diode is grounded and the other connected to the positive end of the battery 2. On the other side of the circuit the −300 volt source is connected to the cathodes of a corresponding pair of diodes 17 through a resistor 27 of the same value as 16. The anode of one diode is grounded and that of the other is connected to the minus side of battery 2.

When the input signal is negative on the grid of the first section of the tube 12 the tube is biased to cutoff and the second section of tube 12 conducts. This produces a flow of current through the resistor 16 and the diodes 11 thus effectively clamping the plus side of the battery to ground. The resistors 13, 15 and 16 are so chosen that the currents through the diodes 11 are the same.

When a positive pulse reaches the grid of the first section of tube 12 this section conducts which results in biasing the second section to cutoff. Now the flow of current through resistor 15 flows through the resistor 27 and one of the diodes 17. Resistors 15 and 27 are also so chosen that the currents through both diodes 17 are the same. This effectively clamps the negative end of the battery 2 to ground.

The switching is exactly the same as in FIGS. 1 and 2. By using pairs of diodes with the proper resistors the drop in potential across the diode connected to the battery 2 is almost perfectly cancelled by the drop of potential in its companion diode connected to ground. This effectively enables clamping of the alternative sides of the potentiometer 3 to ground reference. Negligible error is introduced by the voltage drops across the conducting diodes. This is of importance as will be brought out below in connection with the description of FIG. 4.

Figure 4:
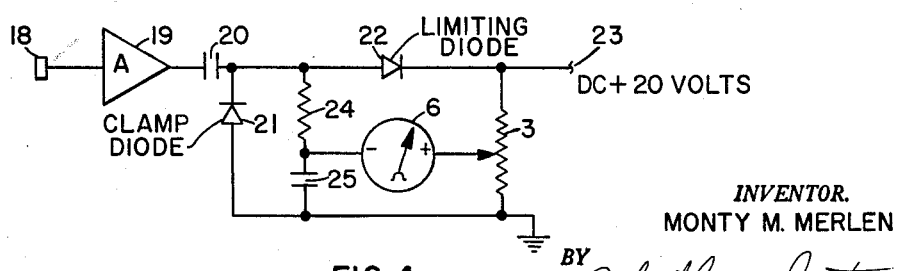
FIG. 4 is a schematic of the original Astheimer circuit.

FIG. 4 shows the original output circuit of the first form of the Astheimer gage. The output of the detector 18 is amplified in the preamplifier 19 and is fed through a capacitor 20 to the output circuit. In this circuit there are two diodes 21 and 22 which limit the swing of the amplifier output voltage at their junction from ground to the D.C. supply voltage 23. A resistor 24 and capacitor 25 perform a function similar to resistor 4 and capacitor 5 in the other figures. The meter 6, however, is now connected from the junction of the resistor 24 and the capacitor 25 to the moving arm of the potentiometer 3. Initial calibration proceeds as described in connection with FIG. 1 and this initial calibration can be just as accurate. However, this type of output circuit presents practical problems.

The first problem relates to the amplifier 19. In order for the circuit to operate the output from this amplifier must be greater than the potential at 23 otherwise no limiting takes place. On the other hand, if the output of the amplifier is too great problems are encountered in the diodes 21 and 22 which will develop excessive voltage drops. In other words, the amplitude of the pulses at the amplifier 19 must be constant within fairly narrow limits. In FIGS. 1 to 3 the accuracy of operation is not affected by the amplitude of the pulses so long as it is adequate to effect switching.

The second problem is presented by the diodes 21 and 22. In common with most solid state components the potential drop across the diodes varies with ambient temperature. This can result in inaccuracies particularly in an unfavorable environment such as a steel mill.

The third problem is posed by the capacitor 25. In order to operate properly this capacitor should not have any significant leakage. With large capacitors as are involved here, for example 8 μfd, this requirement is difficult to meet and even more difficult to maintain. In FIGS. 1 to 3 leakage in the capacitors 5 does not adversely affect the output voltage. Even a considerable amount of leakage which would render the circuit of FIG. 4 useless, causes only a slight change of sensitivity off null. In FIG. 4 leakage will actually change the null reading. As this is the prime factor determining accuracy in the system substantial leakage in the capacitor is fatal.

A final problem is presented when servo mechanisms are to be actuated by an error signal. In FIGS. 1 to 3 at balance this error signal is zero and is a D.C. signal varying about ground. In FIG. 4 the zero reading of the meter is effected by balancing the two voltages on either side of the meter neither of which is ground. This makes the problem of actuating a servo system very difficult although not impossible. Simple servos generally operate on error signals varying with respect to ground or some other fixed reference. Only complicated servo systems with an increased number of electronic circuits can be utilized with the error signal produced in FIG. 4.

It will be seen that the present invention permits marked improvements and increases in reliability over the original Astheimer gage. In the case of FIG. 2 the number of circuit elements is no greater than in FIG. 4. Even in the case of FIG. 3 the operation is not affected by environmental changes.

As has been stated above the circuits of the present invention can be used with any repetitive pulse signals where it is desired to read a duty cycle. Although they are especially useful in radiation gauges their advantages are still obtained regardless of the nature of the instrumentation which produces the input pulses.

I claim:

1. A pulse duty cycle readout instrument comprising in combination, input means for receiving a repetitive pulsed signal, a source of D.C. potential, a resistive load there across, integrating means adjustably connectable to various portions of said resistive load and switching means actuated by the pulse signal for alternately connecting each end of the D.C. potential source load to a predetermined voltage level.

2. An instrument according to claim 1 in which the switching means grounds alternate ends of the D.C. potential source.

3. An instrument according to claim 1 in which the switching means are complementary switching transistors.

4. An instrument according to claim 1 in which the switching means are vacuum tube switching means.

References Cited by the Examiner

UNITED STATES PATENTS

| | | | |
|---|---|---|---|
| 2,323,128 | 6/43 | Hare | 250—83.4 |
| 2,393,631 | 1/46 | Harrison et al. | 250—83.4 |
| 2,659,823 | 11/53 | Vossberg | 250—219 X |
| 2,735,023 | 2/56 | Kozinski | 307—112 |
| 2,737,598 | 3/56 | Lewis et al. | 250—214 |
| 2,812,685 | 11/57 | Vossberg | 88—14 |
| 2,909,924 | 10/59 | Flook et al. | 250—83.3 |
| 2,916,632 | 12/59 | Peterson | 250—83.3 |
| 2,963,595 | 12/60 | Hinricks | 307—112 |
| 2,999,944 | 9/61 | Laycak | 250—219.1 |
| 3,003,064 | 10/61 | Astheimer | 250—83.3 |
| 3,026,415 | 3/62 | Lake et al. | 250—219 |
| 3,101,415 | 8/63 | Libenschek | 250—219 |

LLOYD McCOLLUM, *Primary Examiner.*

RALPH G. NILSON, BENJAMIN A. BORCHELT,
*Examiners.*